(12) United States Patent
Kleverman (10) Patent No.: US 7,556,443 B2
(45) Date of Patent: Jul. 7, 2009

(54) SHOCK DAMPING OF OPTICAL LENS COMPONENTS

(75) Inventor: Mats Kleverman, Helsingborg (SE)

(73) Assignee: Sony Ericsson Mobile Communications AB, Lund (CH)

( * ) Notice: Subject to any disclaimer, the term of this patent is extended or adjusted under 35 U.S.C. 154(b) by 351 days.

(21) Appl. No.: 11/464,926

(22) Filed: Aug. 16, 2006

(65) Prior Publication Data

US 2008/0044174 A1    Feb. 21, 2008

(51) Int. Cl.
G02B 17/00 (2006.01)
G02B 7/02 (2006.01)
G02B 13/16 (2006.01)
H04N 5/225 (2006.01)
H04M 1/00 (2006.01)

(52) U.S. Cl. .................. 396/529; 359/823; 359/826; 348/335; 348/374; 455/556.1; 455/556.2

(58) Field of Classification Search .................. 396/133, 396/529, 533; 359/642, 665, 696, 808, 811, 359/819, 823, 826, 829; 348/335, 373, 374; 455/550.1, 556.1, 556.2
See application file for complete search history.

(56) References Cited

U.S. PATENT DOCUMENTS 2,572,919 A    10/1951    French et al.
3,594,068 A    7/1971    Kirstein et al.
6,069,867 A *    5/2000    Ikegame ............... 369/248
2006/0061885 A1    3/2006    Ito et al.
2006/0132640 A1    6/2006    Tirole et al.
2006/0140609 A1    6/2006    Chen
2006/0153556 A1    7/2006    Lee et al.

FOREIGN PATENT DOCUMENTS

EP    1 591 818 A1    11/2005

OTHER PUBLICATIONS

Written Opinion of the International Searching Authority for International Application No. PCT/IB2007/000366, filed Feb. 15, 2007.
International Search Report of International Application No. PCT/IB2007/000366, filed on Feb. 15, 2007.

* cited by examiner

Primary Examiner—Rochelle-Ann J Blackman
(74) Attorney, Agent, or Firm—Renner, Otto, Boisselle & Sklar, LLP (57) ABSTRACT

A shock and/or vibration damped optical lens assembly for electronic equipment. The optical lens assembly of the present invention is particularly useful for electronic equipment such as mobile phones, PDA's, etc. incorporating cameras. By providing a shock and/or vibration damped optical lens assembly allows such devices to more reliably implement auto-focusing and/or zoom lens packages. Accordingly, the present invention facilitates the use of more advanced lens packages in hand-held electronic equipment such as cell phones, PDA's etc.

24 Claims, 5 Drawing Sheets

SHOCK DAMPING OF OPTICAL LENS COMPONENTS

TECHNICAL FIELD OF THE INVENTION

The present invention relates generally to electronic equipment and, more particularly, to electronic equipment that includes optical lens components, and a method of shock damping of optical lens components of an electronic equipment.

DESCRIPTION OF THE RELATED ART

Conventional mobile phones, in addition to providing voice communication capabilities, also provide a number of non-voice related features. For example, mobile phones can be used to surf the internet, play music and videos, transmit and receive messages (e.g., emails and text messages), take and display photographs, as well as a number of other features.

Mobile phones with camera functions (e.g., camera phones) are popular and are becoming commonplace. By combining a phone with a camera, consumers do not have to carry both devices with them. Camera phones, however, typically do not offer the same level of performance as stand alone digital cameras. Even basic stand-alone digital cameras typically offer auto-focus and optical zoom functionality. Most camera phones, however, use fixed focus lenses and do not offer optical zoom functionality. Accordingly, while camera phones are becoming popular, to most consumers they do not offer a viable alternative to a stand alone digital camera.

Due to small amount of space available in a phone, improving the performance of the lens assemblies is difficult. In particular, allowing for movement of the lenses for focusing and zooming in such a small space is challenging.

Another consideration in designing a camera phone is the increased potential for a camera phone to be dropped and/or mishandled, relative to a stand-alone camera, due to the higher frequency of use of mobile phones. Lens assemblies, and in particular auto-focus and zoom lens assemblies with moving lenses, are typically highly sensitive to shock inputs. Shock inputs in the direction of movement of the lenses are typically the most detrimental to a lens assembly and can render the camera inoperative.

SUMMARY

The present invention provides a shock and/or vibration damped optical lens assembly for an electronic equipment. The optical lens assembly of the present invention is particularly useful for electronic equipment such as mobile phones, PDA's, etc. incorporating cameras. By providing a shock and/or vibration damped optical lens assembly, such devices can more reliably implement auto-focusing and/or zoom lens packages. Accordingly, the present invention facilitates the use of more advanced lens packages in hand-held electronic equipment such as cell phones, PDA's etc.

According to one aspect of the invention, there is provided an optical lens assembly for an electronic equipment including a shock absorbing mount within a housing of the electronic equipment, and an optical lens group supported by the shock absorbing mount. The shock absorbing mount permits relative movement between the optical lens group and the electronic equipment to absorb shock energy.

According to another aspect, the shock absorbing mount includes a sleeve member mountable to the electronic equipment in which an optical lens package including the optical lens group is supported for sliding axial movement relative to the sleeve member. The sleeve member is generally sealed and includes at least one passageway for permitting fluid to flow into and out of the sleeve in response to movement of the optical lens package within the sleeve member.

According to another aspect, the optical lens package divides the sleeve member into two separate chambers each having a respective passageway for permitting fluid to flow into and out of the respective chambers in response to movement of the optical lens package within the sleeve. Movement of the optical lens package in a first axial direction expels fluid from one chamber and draws fluid into the other chamber.

According to another aspect, the optical lens package forms a seal with the sleeve member to prevent substantial flow of fluid between the chambers.

According to another aspect, the passageway includes a flow regulator.

According to another aspect, the flow regulator is an orifice.

According to another aspect, the fluid is air.

According to another aspect, the electronic equipment is a mobile phone.

According to another aspect, the electronic equipment is at least one of a personal audio device, a personal video device, a camera or a personal digital assistant.

According to another aspect, the shock absorbing mount includes a sleeve member mountable to the electronic equipment in which an optical lens package including the optical lens group is supported for sliding axial movement relative to the sleeve member. The optical lens package forms a seal with the sleeve member thereby dividing the sleeve member into two separate chambers. At least one passageway connects the separate chambers for permitting fluid to flow between the chambers in response to movement of the optical lens package within the sleeve member.

According to another aspect, the passageway includes a flow regulator.

According to another aspect, the flow regulator is an orifice.

According to another aspect, the fluid is air.

According to another aspect, the fluid is oil.

According to another aspect, the oil is silicone oil.

According to another aspect, the electronic equipment is a mobile phone.

According to another aspect, the electronic equipment is at least one of a personal audio device, a personal video device, a camera or a personal digital assistant.

According to another aspect the shock absorbing mount is a barrel of an optical lens package including the optical lens group. The barrel includes at least one chamber, and a passageway permits flow of fluid into and out of the chamber in response to movement of the optical lens package to thereby dampen movement of the optical lens package.

According to another aspect, the optical lens group divides the barrel into two chambers each having a respective passageway for permitting fluid to flow into and out of the respective chambers in response to movement of the optical lens package within the sleeve. Movement of the optical lens package in a first axial direction expels fluid from one chamber and draws fluid into the other chamber.

According to another aspect, the optical lens group forms a seal with the barrel to prevent substantial flow of fluid between the chambers.

According to another aspect, the passageway includes a flow regulator.

According to another aspect, the flow regulator is an orifice.

According to another aspect, the fluid is air.

According to another aspect, the electronic equipment is a mobile phone.

According to another aspect, the electronic equipment is at least one of a personal audio device, a personal video device, a camera or a personal digital assistant.

Another aspect of the invention relates to a method of damping an optical lens group of an electronic equipment including supporting the optical lens group for axial movement relative to the electronic component, and damping movement of the optical lens group.

According to another aspect, the damping includes damping movement of the optical lens group with a fluid.

According to another aspect, the damping includes configuring the optical lens group so that movement of the optical lens group forces fluid surrounding at least a portion of the optical lens group through a passageway.

To the accomplishment of the foregoing and the related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be suitably employed.

Other systems, methods, features, and advantages of the invention will be or become apparent to one with skill in the art upon examination of the following drawings and detailed description. It is intended that all such additional systems, methods, features, and advantages be included within this description, be within the scope of the present invention, and be protected by the accompanying claims.

Although the invention is shown and described with respect to one or more embodiments, it is to be understood that equivalents and modifications will occur to others skilled in the art upon the reading and understanding of the specification. The present invention includes all such equivalents and modifications, and is limited only by the scope of the claims.

Also, although the various features are described and are illustrated in respective drawings/embodiments, it will be appreciated that features of the given drawing or embodiment may be used in one or more other drawings or embodiments of the invention.

It should be emphasized that the term "comprise/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION OF EMBODIMENTS

The present invention will now be described with reference to the drawings, wherein like reference numerals are used to refer to like elements throughout.

The term "electronic equipment" includes portable radio communication equipment. The term "portable radio communication equipment," which hereinafter is referred to as a "mobile radio terminal," a "mobile phone," a "mobile device," or a "mobile terminal" and the like, includes all equipment such as mobile telephones, pagers, communicators, i.e., electronic organizers, personal digital assistants (PDAs), smartphones, portable communication apparatus or the like. The term "electronic equipment" also may include portable digital music and/or video devices, e.g., iPod devices, mp3 players, etc.

In the present application, the invention is described primarily in the context of a mobile phone. However, it will be appreciated that the invention is not intended to be limited to a mobile phone and can be any type of electronic equipment.

Figure 1:
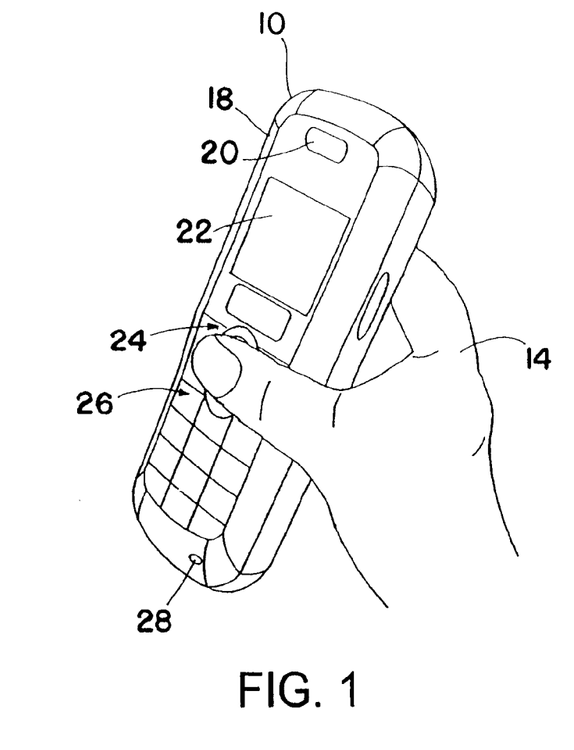
FIG. 1 is an illustration of an exemplary mobile phone.
Figure 2:
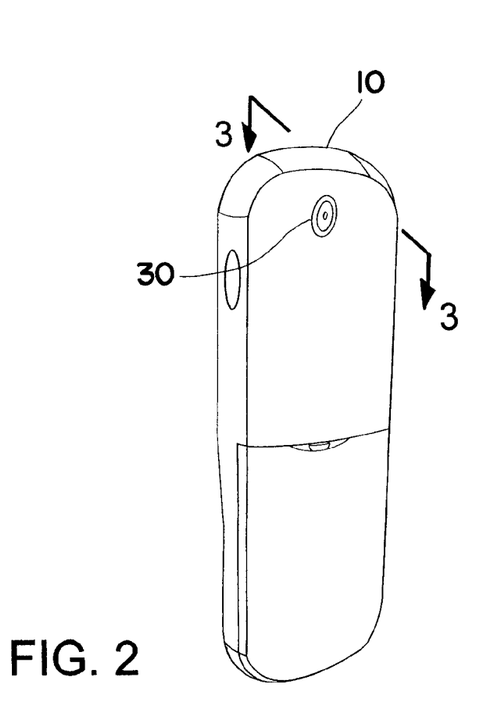
FIG. 2 is another view of the mobile phone of FIG. 1.

Referring now to FIGS. 1 and 2, a mobile phone 10 is shown as having a "brick" or "block" design type housing 18 (sometimes referred to as a case), but it will be appreciated that other type housings, such as, for example, clam shell or slide-type housings, may be utilized without departing from the scope of the invention. The mobile phone 10 further includes a speaker 20, display 22, a navigation switch and selection/function keys or switches 24, a key pad 26, a microphone 28, and an external camera lens 30 of a camera (see, FIG. 2); these are illustrative and exemplary of parts of a typical mobile phone, but it will be appreciated that other parts that are similar or different in form and/or function may be included in the mobile phone 10. The mobile phones to which the invention pertains also may be of the types that have more or fewer functions, keys, etc., compared to those illustrated and described herein.

As will be appreciated, the mobile phone 10 may function as a conventional mobile phone. The mobile phone 10 may have additional functions and capabilities that may be developed in the future. From a conventional point of view, the display 22 displays information to a user, such as operating state, time, phone numbers, contact information, various navigational menus, etc., which facilitate and/or enable the user to utilize the various features of the mobile phone. The display also may be used to view movies, images, play games, or as a viewfinder for the camera, for example. Part or all of the display 22 may be a touch screen type device. The navigation and function keys 24 and the keypad 26 may be conventional in that they provide for a variety of user operations. For example, one or more of the function keys and navigation device 24 may be used to navigate through a menu displayed on the display 22 to select different phone functions, profiles, settings, etc., as is conventional. The keypad 26 typically includes one or more special function keys, such as, a "call send" key for initiating or answering a call, a "call end" key for ending or hanging up a call, and dialing keys for dialing a telephone number. Other keys included in the navigation and function keys 24 and/or keypad 26 may include an on/off power key, a web browser launch key, a camera key, a voice mail key, a calendar key, etc.

Figure 3:
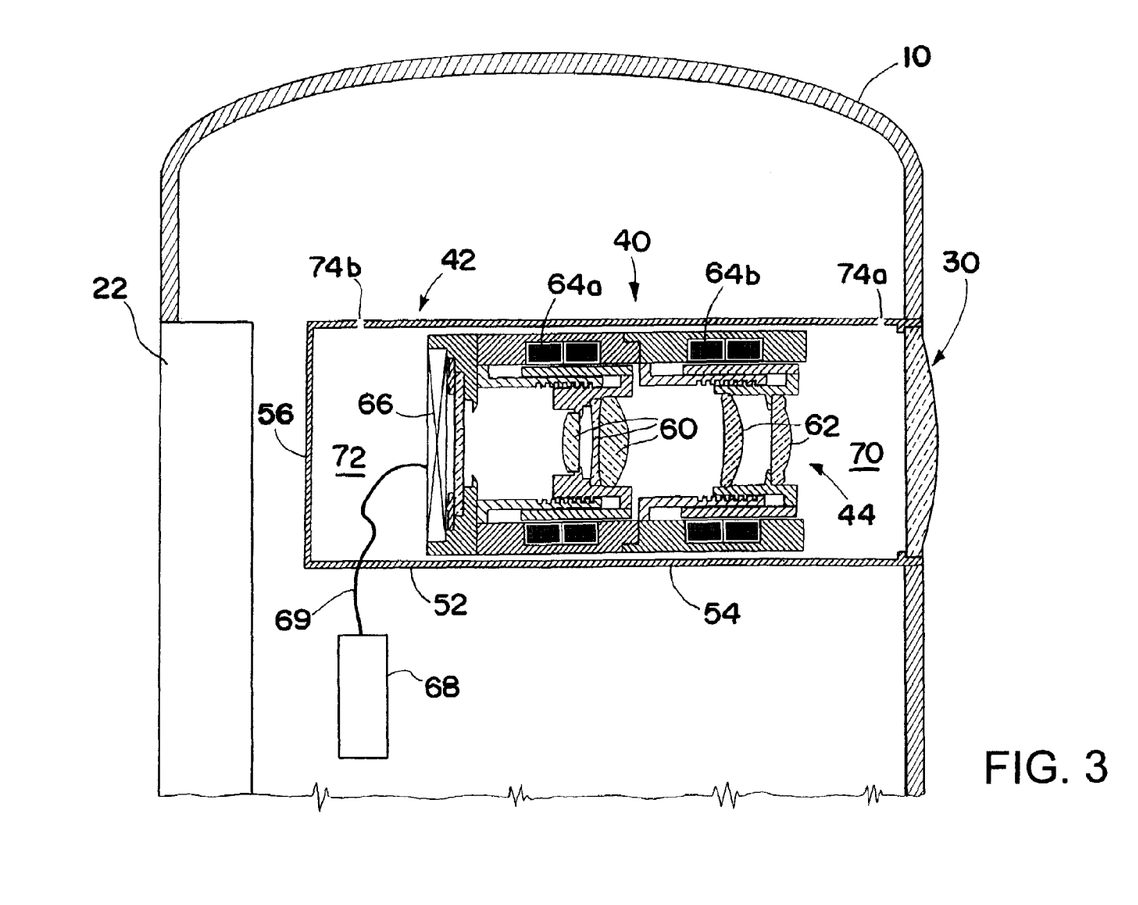
FIG. 3 is a cross-sectional view taken along the line a-a of FIG. 2 illustrating an exemplary embodiment of an optical lens assembly in accordance with the present invention.

FIG. 3 is a cross-sectional view of the phone 10, taken along the line a-a in FIG. 2, illustrating an exemplary optical lens assembly 40 in accordance with an embodiment of the invention. The optical lens assembly 40 includes a shock absorbing mount 42 and an optical lens package 44 supported by the shock absorbing mount 42. The shock absorbing mount 42 permits relative movement between the optical lens package 44 and the phone 10 to absorb shock energy, such as when the phone is dropped.

The shock absorbing mount 42 includes a sleeve member 52, which in the illustrated embodiment is a generally cylindrical sleeve member. The sleeve member 52 has a cylindrical side wall 54 and an end cap 56 at a first end thereof. The opposite end of the cylindrical side wall terminates adjacent to the external camera lens 30. Supported within the sleeve member 52 is the optical lens package 44.

The optical lens package 44 includes a focus lens group 60 and a zoom lens group 62. It will be appreciated that the configuration of the lenses in the optical lens package 44 is not germane to the invention and that other lens configurations can be used. A lens group can have a single lens or a plurality of lenses. The optical lens package 44 also includes motors 64a and 64b for moving the one or more lenses in the lens groups 60 and 62 towards and away from each other to effect focusing and zooming. An image sensor, such as CCD image sensor 66, is disposed behind the focus lens group 60 and captures subject light, which has passed through the external cameral lens 30 and is focused on a light-receiving surface of the CCD image sensor 66. The CCD image sensor converts the light to an analog image signal that is outputted to an image-signal processing unit 68 via a flexible connection 69.

The optical lens package 44 is supported in the sleeve member 52 for axial movement along its longitudinal axis which, in the illustrated embodiment, is parallel with the direction of movement of the lenses of lens groups 60 and 62. It will be appreciated, however, that in other configurations the direction of movement of the lenses may not be parallel with the longitudinal axis of the optical lens package. In such configurations, the optical lens package 44 preferably is supported for movement in the sleeve member 52 in a direction parallel to the direction of movement of the lenses.

The sleeve member 52 is divided by the optical lens package 44 into two separate chambers 70 and 72. The chambers 70 and 72 can be filled with any suitable fluid, such as air, for example. Other fluids such as certain oils (e.g., silicone oil) can also be used. Passageways 74a and 74b are provided in the cylindrical sidewall 54 creating a path for fluid to flow into and out of each chamber 70 and 72 as the optical lens package 44 is displaced. By way of example, if the optical lens package 44 is displaced to the left in FIG. 3, the volume of chamber 70 increases while the volume of chamber 72 decreases. This results in a drop in the air pressure in chamber 70 and, consequently, air is drawn into chamber 70 via passageway 74a. The displacement also causes an increase in the air pressure in chamber 72 and, consequently, air is forced out of passageway 74b. It will be appreciated that the size of the passageways 74a and 74b is such that flow of air into and out of the chambers 70 and 72 is restricted thereby producing a damping movement of the optical lens package 44. As with each of the embodiments discussed herein, one may control the particular amount of damping by selecting appropriate sized passageways, etc., as will be appreciated. Preferably, sufficient damping movement is provided to avoid damage to the optical lens package 44 in the event the mobile phone 10 is dropped, but otherwise the optical lens package 44 remains generally fixed in position with normal use of the mobile phone 10.

Accordingly, in the illustrated embodiment, movement of the optical lens package 44 is damped by the increase in air pressure in the chamber on the side to which the optical lens package 44 shifts. It will be appreciated that the decreased pressure (e.g., suction) in the opposite chamber can also dampen movement of the optical lens package 44.

It will be appreciated that a resilient member, such as a spring (not shown), can be provided to return the optical lens package 44 to the neutral position illustrated in FIG. 3. The resilient member can be interposed between the optical lens package 44 and the end cap 56, for example.

Figure 4:
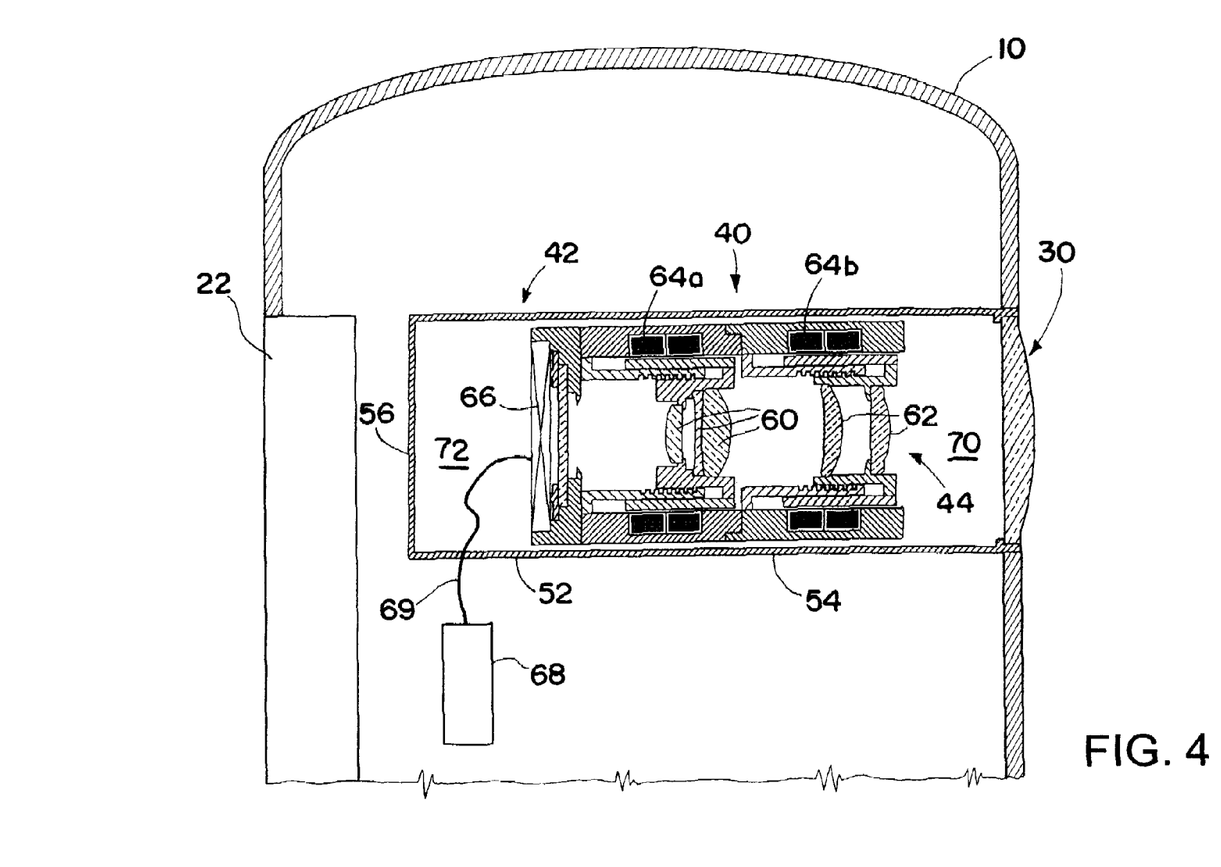
FIG. 4 is another cross-sectional view taken along the line a-a in FIG. 2 illustrating another exemplary embodiment of an optical lens assembly in accordance with the present invention.
Figure 5:
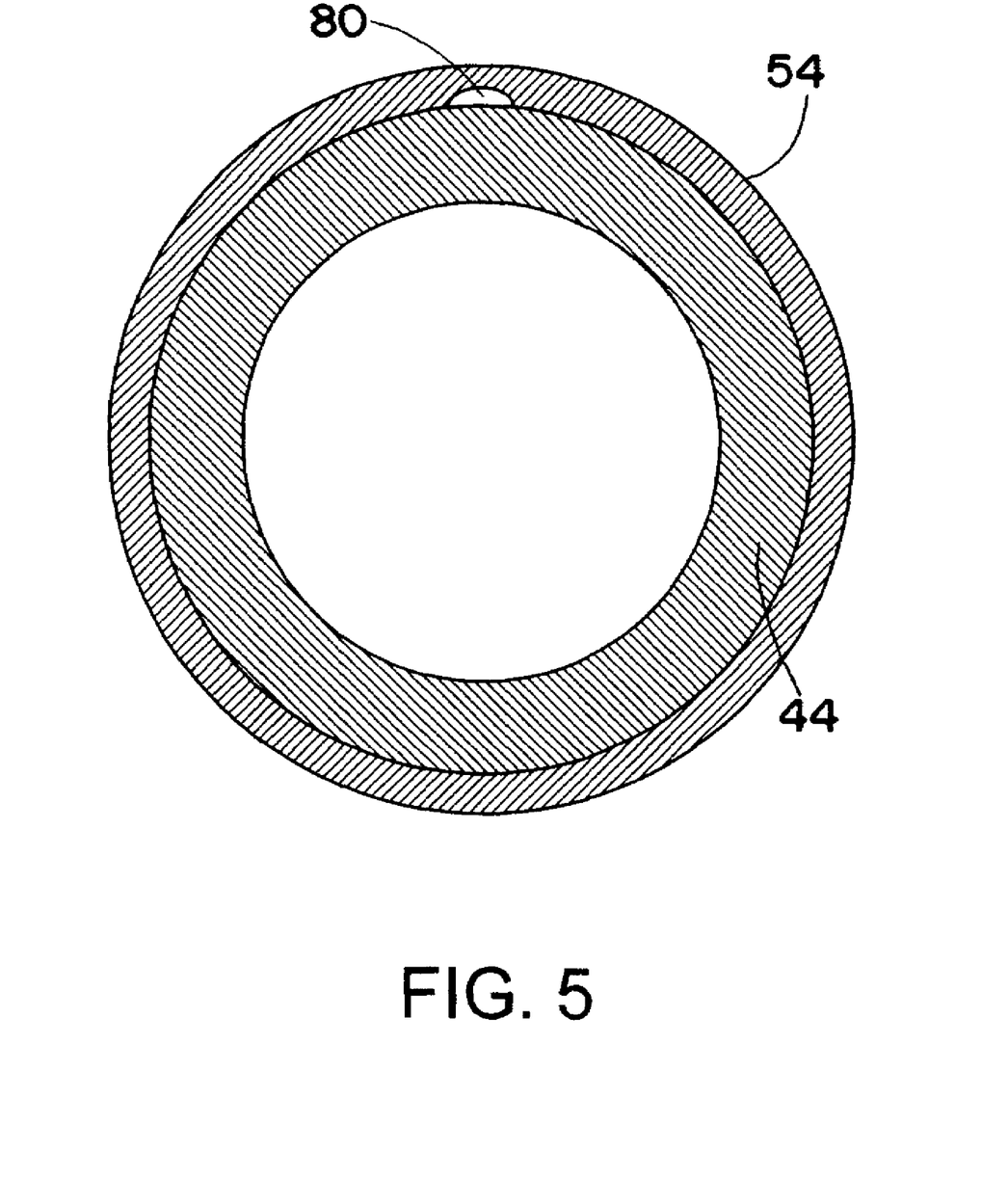
FIG. 5 is a cross-sectional view of the exemplary optical lens assembly of FIG. 4.

Turning to FIGS. 4 and 5, another exemplary optical lens assembly 40 in accordance with an embodiment of the invention is illustrated. The optical lens assembly 40 of FIG. 4 is similar in most aspects to the optical lens assembly of FIG. 3 except that it is sealed and therefore does not have passageways 74a and 74b. Fluid flows between the chambers 70 and 72 via a connecting passageway, which in the illustrated embodiment is a channel 80 in the sleeve member 54, as shown in FIG. 5.

The channel 80 is sized to restrict flow of fluid between the chambers 70 and 72 so that movement of the optical lens package 44 is damped. Accordingly, the channel can be sized and/or shaped as a restricting orifice. Displacement of the optical lens package 44 to the left in FIG. 4 will tend to decrease the volume of chamber 72 and increase the volume of chamber 70 thereby forcing fluid into chamber 70 via channel 80.

This embodiment is particularly well suited to the use of a liquid, such as silicone oil, as it is self-contained and does not vent to a fluid source (e.g. the atmosphere) outside the sleeve member 54. As such, although not shown, the chambers 70 and 72 can be filled with a suitable damping liquid. It will be appreciated that other connecting passageways between the chambers 70 and 72 can be provided. For example, the optical lens package 44 can have one or more passageways connecting the chambers 70 and 72. As another example, leakage at the interface of the sleeve member 54 and the optical lens package 44 can serve as the connecting passageway.

It will be appreciated that the chambers 70 and 72 can be any suitable size. In addition, the chambers 70 and 72 can be filled or partially filled with resilient material, such as rubber or foam, for absorbing shock inputs.

While in some applications air alone can provide adequate damping, each of the above-described exemplary embodiments can achieve additional damping by the application of a high viscosity grease or oil to the interface between the sleeve member 54 and the optical lens package 44. Such high viscosity grease or oil, while providing lubrication to the interface, can have certain surface effects (e.g., stickiness) that tend to produce a drag that would oppose movement of the optical lens package 44. Accordingly, in some applications the use of such grease or oil alone can be sufficient to provide suitable damping of the motion of the optical lens package 44.

The principles of shock dampening heretofore described can be applied to other types of lens configurations. For example, in FIG. 6 an optical lens assembly 100 that can be mounted or supported in the housing of an electronic equipment, such as mobile phone 10, is illustrated. The optical lens assembly 100 includes a barrel 102 fixed relative to the body of the mobile phone 10, a fixed lens group 104, a movable lens group 106, and a piezoelectric element 108. An image sensor package 110 includes a cover 112, a holder 114, and an image sensor 116 fixed relative to the body of the mobile phone 10. A power supply 118 provides power to the image sensor package 110 and piezoelectric element 108.

Figure 6:
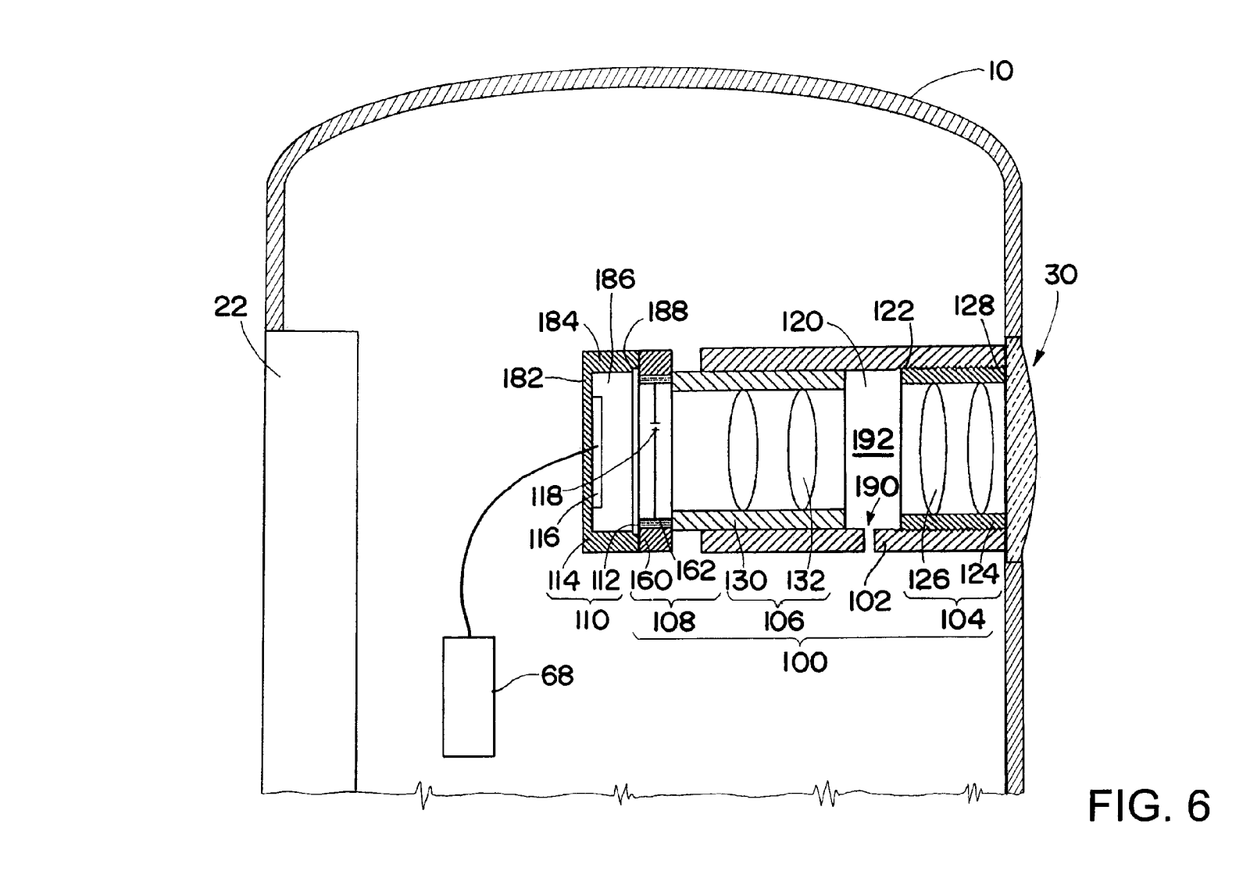
FIG. 6 is a cross-sectional view of another exemplary embodiment of an optical lens assembly in accordance with the present invention.

The barrel 102 is hollow and cylinder-shaped and has a through hole 120 therein. A part of the inside wall of the barrel 102 defines an inner screw thread 122. The other part of the inside wall of the barrel 102 is smooth.

The fixed lens group 104 includes a fixed drawtube 124 and a first lens group 126. The fixed drawtube 124 is hollow and cylinder-shaped. The outside wall of the fixed drawtube 124 has an outside screw thread 128 thereon. The first lens group 126 includes one or more lenses (not individually labeled) mounted in the fixed drawtube 124. The fixed lens group 104 is assembled in the barrel 102. The outside screw thread 128 threadingly mates with the inner screw thread 122 of the barrel 102.

The movable lens group 106 includes a movable drawtube 130 and a second lens group 132. The movable drawtube 130 is hollow and cylinder-shaped. The second lens group 132 includes one or more lenses (not individually labeled) mounted in the movable drawtube 130. The movable lens group 106 is slidably assembled in the barrel 102 and engages with the smooth part of the inside wall of the barrel 102. The movable lens group 106, as illustrated, partly protrudes out of the barrel 102. In other embodiments to movable lens group 106 can be fully contained within the barrel 102, as will be appreciated.

The piezoelectric element 108, which is fixed relative to the body of the mobile phone 10, includes a substrate 160 and a piezoelectric portion 162. The substrate 160 is hollow and cylinder-shaped. The piezoelectric portion 162 is arranged on the inside surface of the substrate 160. The piezoelectric portion 162 can also or alternatively be positioned on the outside surface of the substrate 160. The piezoelectric portion 162 can be made, e.g., of any of zinc oxide, lithium niobate, and lithium tantalate, or any other suitable piezoelectric material. One end of the movable lens group 106 is fixed to one end of the piezoelectric element 108. The substrate 160 can be made of an elastic material, thereby facilitating changes in length of the piezoelectric portion 162 and providing mechanical support for the piezoelectric portion 162. Accordingly, the movable lens group 106 is generally free to move axially within the barrel 102 in response to movement of the piezoelectric element 108.

The cover 112 is a piece of glass or another transparent solid material. The cover 112 is mounted on the holder 114 to prevent dust from falling in or otherwise reaching the interior of the holder 114.

The holder 114 is hollow and cylinder-shaped. The holder 114 includes a base plate 182 and a sidewall 184. The base plate 182 and the sidewall 184 together establish a cavity 186. Opposite to the base plate 182, a sidestep 188 is defined in the holder 114. The cover 112 is set on the sidestep 188 of the holder 114.

The image sensor 116 is mounted on the base plate 182 of the holder 114. The image sensor 116 is electrically connected to a PCB (print circuit board) (not shown), thereby allowing the digital processing of the image data collected by the image sensor 116.

The power supply 118 supplies direct current to the piezoelectric element 108, as well as the image sensor 116 and the PCB. The anode and the cathode are respectively connected to two different positions of the piezoelectric portion 162. The piezoelectric portion 162 will variably deform, according to the voltage/current of the power supply 118.

When assembling the optical lens assembly 100, the first lens group 124 and the second lens group 132 are respectively mounted in the fixed drawtube 124 and the movable drawtube 130 to form the fixed lens group 104 and the movable lens group 106. Then, the fixed lens group 104 is inserted into the barrel 102. The outside screw thread 128 of the fixed drawtube 124 mates with the inner screw thread 122 of the barrel 102. The fixed lens group 104 is finally fixed in the barrel 102 by glue/adhesive, by fusion/brazing/soldering, and/or by a mechanical means. Inserted into the barrel 102, the movable lens group 106 can slide relative to the barrel 102 along an axis of the barrel 102. The cover 112, the holder 114, and the image sensor 116 are assembled into the image sensor package 110 beforehand. Meanwhile, the power supply 118 is connected to the piezoelectric portion 162 of the piezoelectric element 108. Finally, the piezoelectric element 108 is assembled between the barrel 102 and the holder 114. One end of the piezoelectric element 108 engages the movable lens group 106, with one corresponding end of piezoelectric portion 62 being fixed to the movable lens group 106 and an opposite end of the piezoelectric element 108 being permanently attached to the holder 114 and the cover 112.

In accordance with an aspect of the invention, the optical lens assembly 100 also includes a passageway 190 for allowing fluid, such as air, to flow into and out of the barrel 102 in response to movement of the movable lens group 106. As will be appreciated, a chamber 192 between the fixed lens group 104 and movable lens group 106 within the barrel 102 is generally sealed except for the passageway 190. The passageway is sized, as previously described, to restrict the flow of fluid therethrough to thereby dampen movement of the movable lens group 106. Instead of the passageway 190 or in addition thereto, one or more channels (not shown) can be provided in the barrel 102 and/or the movable drawtube 130 to allow fluid to flow from the chamber 192 in response to movement of the movable lens group 106. For example, a channel such as channel 80 in the embodiment of FIGS. 4 and 5 can be provided on the inner surface of the barrel 102 extending from the chamber 192 to the lower end of the barrel 102. In an embodiment wherein the movable lens group 106 is fully contained within the barrel 102, one or more channels can connect chambers separated by the movable lens group 106 for allowing fluid to flow therebetween in the manner illustrated in FIGS. 4 and 5, for example.

It will now be appreciated that the present invention provides an optical lens assembly including a shock absorbing mount that tends to absorb shock inputs to thereby dampen movement of an optical lens package. Accordingly, the invention is particularly useful for electronic equipment such as mobile phones, PDA's, etc. with integrated cameras that are likely to be dropped and or mishandled resulting in severe shock inputs. The invention is applicable to a wide variety of lens packages and/or assemblies and/or other camera components. Although the illustrated embodiments describe motor and piezoelectric element actuated optical lens assemblies, it will be appreciated that the invention can be used with lens assemblies that are actuated by other mechanisms such as, for example, stepper motors, solenoids, etc. Further, it will be appreciated that other damping arrangements can be implemented using principles of the invention. For example, more than one lens group within a barrel can be configured for damping in accordance with the invention.

It will further be appreciated that the rate of damping of the lens group is dependent in part upon the rate at which fluid flows into or out of the one or more chambers. It will be appreciated, therefore, that the desired damping generally is achieved by controlling this rate. In that regard, the chamber or chambers into and out of which fluid flows generally will be sealed except for the passageway that permits flow of fluid into and out of the chamber. Accordingly, controlling the rate of flow through the passageway in turn controls the rate of flow into and out of the chamber. Some leakage of fluid into and out of such chambers, however, can exist without departing from the scope of the invention.

Specific embodiments of the invention have been disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An optical lens assembly for an electronic equipment comprising:
   a shock absorbing mount within a housing of the electronic equipment; and
   an optical lens group supported by the shock absorbing mount;
   wherein the shock absorbing mount permits relative movement between the optical lens group and the electronic equipment to absorb shock energy; and
   wherein the shock absorbing mount includes a sleeve member mounted to the electronic equipment in which an optical lens package is supported for sliding axial movement relative to the sleeve member, the optical lens package supporting the optical lens group, and wherein the sleeve member is generally sealed but includes at least one passageway for permitting fluid to flow into and out of the sleeve in response to movement of the optical lens package within the sleeve member.

2. An optical lens assembly for an electronic equipment as set forth in claim 1, wherein the optical lens package divides the sleeve member into two chambers each having a respective passageway for permitting fluid to flow into and out of the respective chambers in response to movement of the optical lens package within the sleeve, whereby movement of the optical lens package in a first axial direction expels fluid from one chamber and draws fluid into the other chamber.

3. An optical lens assembly for an electronic equipment as set forth in claim 1 wherein the optical lens package forms a seal with the sleeve member to prevent substantial flow of fluid between the chambers.

4. An optical lens assembly for an electronic equipment as set forth in claim 1, wherein the passageway includes a flow regulator.

5. An optical lens assembly for an electronic equipment as set forth in claim 4, wherein the flow regulator is an orifice.

6. An optical lens assembly for an electronic equipment as set forth in claim 1, wherein the fluid is air.

7. An optical lens assembly as set forth in claim 1, wherein the electronic equipment is a mobile phone.

8. An optical lens assembly as set forth in claim 1, wherein the electronic equipment is at least one of a personal audio device, a personal video device, a camera or a personal digital assistant.

9. An optical lens assembly for an electronic equipment as set forth in claim 1, wherein the sleeve is a barrel of the optical lens package.

10. An optical lens assembly for an electronic equipment as set forth in claim 9, wherein the optical lens group divides the barrel into two chambers each having a respective passageway for permitting fluid to flow into and out of the respective chambers in response to movement of the optical lens package within the barrel, whereby movement of the optical lens package in a first axial direction expels fluid from one chamber and draws fluid into the other chamber.

11. An optical lens assembly for an electronic equipment as set forth in claim 9, wherein the optical lens group forms a seal with the barrel to prevent substantial flow of fluid between the chambers.

12. An optical lens assembly for an electronic equipment as set forth in claim 9, wherein the passageway includes a flow regulator.

13. An optical lens assembly for an electronic equipment as set forth in claim 12, wherein the flow regulator is an orifice.

14. An optical lens assembly for an electronic equipment as set forth in claim 9, wherein the fluid is air.

15. An optical lens assembly as set forth in claim 9, wherein the electronic equipment is a mobile phone.

16. An optical lens assembly as set forth in claim 9, wherein the electronic equipment is at least one of a personal audio device, a personal video device, a camera or a personal digital assistant.

17. An optical lens assembly for an electronic equipment comprising:
   a shock absorbing mount within a housing of the electronic equipment; and
   an optical lens group supported by the shock absorbing mount;
   wherein the shock absorbing mount permits relative movement between the optical lens group and the electronic equipment to absorb shock energy; and wherein the shock absorbing mount includes a sleeve member mountable to the electronic equipment in which an optical lens package including the optical lens group is supported for sliding axial movement relative to the sleeve member, wherein the optical lens package forms a seal with the sleeve member thereby dividing the sleeve member into two separate chambers, and wherein at least one passageway connects the separate chambers for permitting fluid to flow between the chambers in response to movement of the optical lens package within the sleeve member.

18. An optical lens assembly for an electronic equipment as set forth in claim 17, wherein the passageway includes a flow regulator.

19. An optical lens assembly for an electronic equipment as set forth in claim 18, wherein the flow regulator is an orifice.

20. An optical lens assembly for an electronic equipment as set forth in claim 17, wherein the fluid is air.

21. An optical lens assembly for an electronic equipment as set forth in claim 17, wherein the fluid is oil.

22. An optical lens assembly for an electronic equipment as set forth in claim 21, wherein the oil is silicone oil.

23. An optical lens assembly as set forth in claim 17, wherein the electronic equipment is a mobile phone.

24. An optical lens assembly as set forth in claim 17, wherein the electronic equipment is at least one of a personal audio device, a personal video device, a camera or a personal digital assistant.

* * * * *